UNITED STATES PATENT OFFICE.

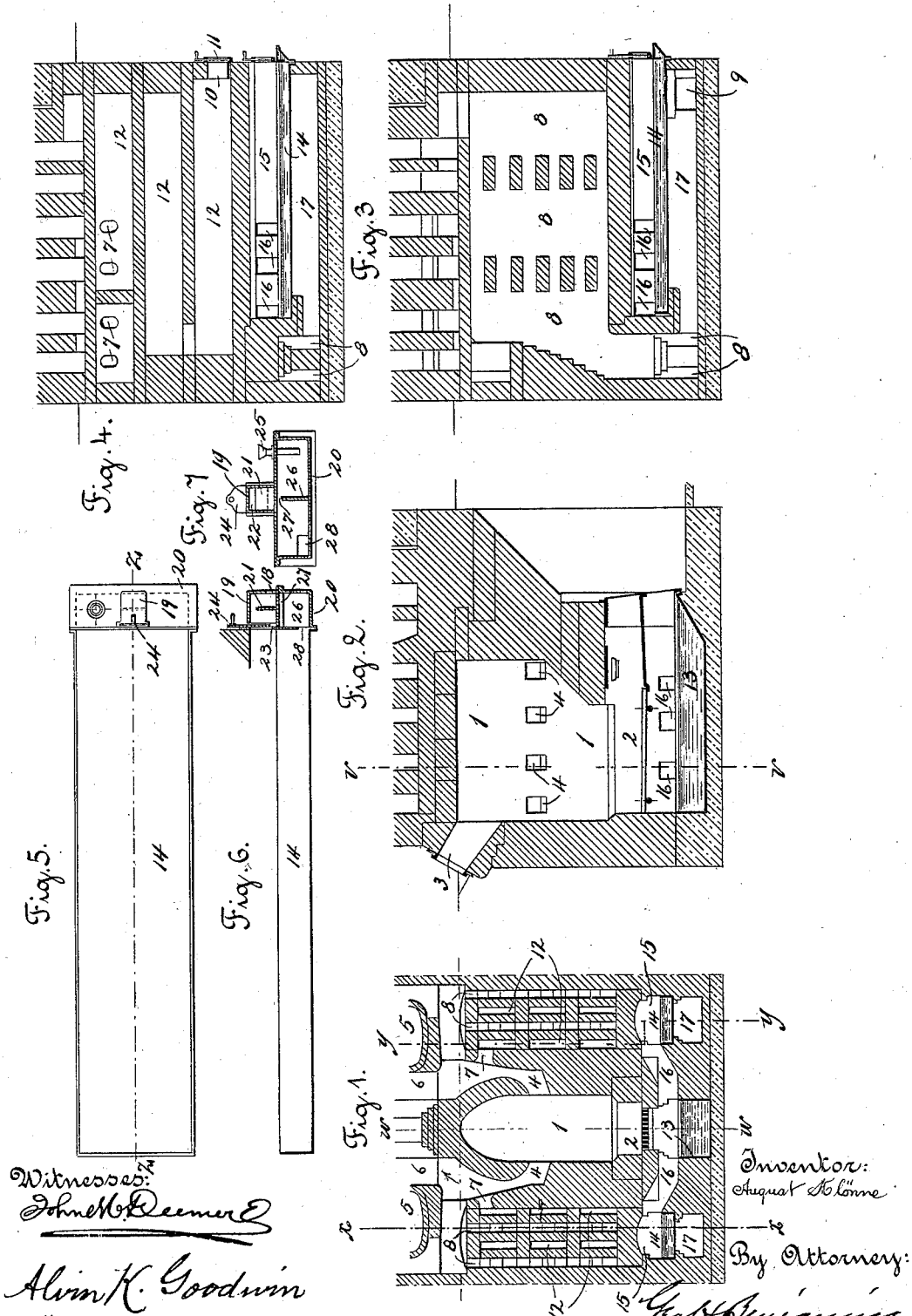

AUGUST KLÖNNE, OF DORTMUND, GERMANY.

FURNACE.

SPECIFICATION forming part of Letters Patent No. 513,515, dated January 30, 1894.

Application filed July 31, 1893. Serial No. 481,953. (No model.)

*To all whom it may concern:*

Be it known that I, AUGUST KLÖNNE, engineer, a subject of the German Emperor, residing at Dortmund, in the Kingdom of Prussia and German Empire, have invented certain new and useful Improvements in Generator-Furnaces; and I do hereby declare the following to be a full, clear, and exact description of the invention, such as will enable others skilled in the art to which it appertains to make and use the same.

My invention relates to generator furnaces used for firing or heating retorts when making gas, or for other purposes, and has for its object to provide a furnace of this character which will produce intensely hot products of practically uniform temperature and free from carbonic acid gas, and in which the formation of slag on the walls of the generator is prevented, whereby the efficiency and durability of the whole structure are promoted.

The invention consists in certain peculiarities in construction of the primary generator and its flues relatively to the feeding door and to the secondary combustion chamber or secondary air flues, and in a special arrangement of water vaporizing pans in the furnace, and in peculiar arrangements of parts providing for supply of pure air and water as these are needed in the furnace.

The invention will first be described and then will be defined in the claims hereinafter set forth.

Reference is to be had to the accompanying drawings, forming a part of this specification and in which like numerals indicate similar parts in all the views.

Figure 1 is a transvere vertical sectional view of my improved furnace, taken on the line *v, v*, in Fig. 2, and shows portions of two retorts in the secondary combustion chamber above the furnace. Fig. 2 is a central, vertical longitudinal section, taken on the line *w, w*, in Fig. 1. Fig. 3 is a vertical longitudinal section, taken on the line *x, x*, in Fig. 1. Fig. 4 is a vertical longitudinal section, taken on the line *y, y*, in Fig. 1. Fig. 5 is a plan view of one of the laterally disposed water vaporizing pans. Fig. 6 is a vertical longitudinal section of the pan taken on the line *z, z*, Fig. 5, and Fig. 7 is a detail transverse section of the outer box-like portion of the pan.

In the furnace shown, there is but one generator 1, having a bottom grate 2, and a door or opening 3, with which a feeding chute (not shown) communicates to maintain automatic supply of coal or fuel to the generator and up to about the level shown in Fig. 2 of the drawings or sufficiently above the hot product flue outlets 4, of the generator to compel all air which would enter said flues either from the feeding door or chute or otherwise, to pass through the incandescent fuel and be completely converted into carbonic oxide before passing upward to and around retorts 5, in the secondary combustion chamber 6, for reducing the contents of said retorts.

Fig. 1 shows that the closed top of the generator is arched or semi-elliptical which form has a tendency to crowd downward the fuel entering at 3, and distribute it evenly along the hot product outlet flues 4.

At the sides of the generator 1 are the gratings for heating of the secondary air by the downflowing hot products prior to passage of said air through lateral flues 7, into the flues 4 to commingle therein with the hot products and pass thence to the secondary combustion chamber and retorts. The hot products circulate downward through the grating flues 8, and finally pass off through a lower flue 9, to an uptake or for further use for heating purposes, while the secondary air which is or may be admitted through front openings 10, controlled by dampers 11, passes circuitously through flues 12, and when highly heated escapes through the flues 7, into flues 4, as above explained. It will be noticed that both the hot product flues 8, and air flues 12, of the gratings are very narrow in proportion to their height hence the waste hot products heat the secondary air very quickly and thoroughly on its way to the secondary combustion chamber. The arrangement of the hot product and air flues is shown clearly in Figs. 1, 3 and 4 of the drawings.

Below the generator grate 2, there is arranged an ordinary water vaporizing pan 13, which has the usual disadvantages of becoming dirty by the falling of ashes from the grate into it, and of being burned out by the heat radiated downward from the grate. This pan 13, supplies the usual amount of steam which rises from the water in it and through the grate and promotes durability of the latter while having some influence in supplying moisture to the charge of fuel in the generator to promote combustion thereof.

A special feature of my invention consists in providing one or more auxiliary vaporizing pans 14, two being shown in Fig. 1 of the drawings, one pan under each of the secondary combustion chamber air and hot product gratings. These auxiliary pans are each arranged at the bottom of an independent chamber 15, which is connected by lateral flues, or passages 16, with the space or chamber between the middle pan 13 and the generator grate 2. The bottoms of the auxiliary vaporizing pans form the bottoms or floors of the chambers 15, and lie above a lower flue 17, into and through which the hot products pass from the flues 8 on their way to the final outlet or uptake flue 9, above mentioned and shown in Fig. 3 of the drawings.

It will be noticed that the chambers 15 (of which the pans 14 form the bottom wall) have closed top, side and end walls and thus are separate and distinct from the hot product flues in the gratings above or behind them, and while these closed walls, by radiating heat to the auxiliary vaporizing pans 14, raise steam from the water therein, it is obvious that said walls prevent contamination by the hot products of the steam or vapor thus generated and allow the steam to pass from the chambers 15, through the lateral passages 16, to the chamber below the generator grate 2, wherein they mingle with the vapor arising from the intermediate vaporizing pan 13, and rise through the grate into the generator in sufficient volume to prevent formation of slag or clinker on the interior of the generator walls while facilitating the most complete combustion of the fuel charge within the generator. Were the laterally disposed pans 14 alone used they would supply sufficient steam or vapor to and through the grate 2, to prevent formation of slag in the generator. It is preferred however to use both the pans 13 and 14, as shown in the drawings.

The primary combustion air is fed to and through the chambers 15, and flows therefrom through the passages 16, with the vapor from the pans 14 to the grate 2 and generator 1. This primary combustion air is admitted through openings 18, in upward extensions or casings 19, formed or placed on the projecting and practically closed box-like ends or front portions 20, of the auxiliary vaporizing pans 14, one of which is shown in enlarged detail views, Figs. 5, 6 and 7 of the drawings. Immediately in front of the low air inlet opening 18, of the casing 19, there is a plate 21 which is closed to the bottom and end walls of said casing but is removed a little from its top wall to provide a passage 22, over said plate, while at the back of the casing 19 there is another opening 23, fitted with a valve 24, by which the volume of air admitted to the chamber 15 above the pan 14 may be controlled or regulated at will. The air thus entering at 18 will first strike the plate 21 which will hold back the dust and allow the comparatively clean pure air to pass through the opening 22 above said plate and thence downward and through that portion of the opening 23 left open by the valve 24, and thence along over the vaporizing water in the pan 14 to the flues 16, and thence through the grate 2 into the generator 1, for purposes above explained.

The box-like front end portion 20 of the vaporizing pan 14 is provided with a water feed pipe 25 and an intermediate transverse riffle plate or partition 26, tight at the bottom and ends but providing a passage 27 over its top, while an opening 28 is provided in the rear wall of the box 20 for flow of water passing over partition 26 into the body portion of the pan. It is obvious that the water thus supplied through the pipe 25 will deposit its sediment in the first compartment of the end casing 20 in front of the riffle plate 26 and only the comparatively pure water will pass over said plate and thence through opening 28 to the main body of the vaporizing pan. Any number of adjacent vaporizing pans may be supplied with pure water from a feed pipe 25 on one pan by connecting the several pans with a suitable water pipe.

From the foregoing it is manifest that the supply of primary combustion air and also the supply of water fed to the auxiliary vaporizing pans are both comparatively pure and therefore mutually assist in assuring the best operative results of or from the furnace by promoting the production of hot products free from carbonic acid and having maximum heating effect on the retorts or other substances to be fired in the regenerative chamber.

I claim as my invention—

1. A generator furnace constructed with a generator having a closed top and lower hot product outlets leading to the upper secondary combustion chamber, and a feed opening discharging fuel into the generator at the level above its hot product outlets, substantially as described.

2. A generator furnace constructed with a generator having a closed and arched or semi-elliptical top and side hot product outlets at or below the spring of the arched top and leading to the secondary combustion chamber, and a feed opening discharging fuel into the generator at a level above its hot product outlets, substantially as described.

3. A generator furnace constructed with a generator having a closed top and lower hot product outlets leading to the upper secondary combustion chamber, secondary air heating gratings at the sides of the generator opening to the atmosphere and to the hot product flues of the generator, and a feed opening discharging fuel into the generator at a level above its hot product outlets, substantially as described.

4. A generator furnace constructed with a generator, secondary air heating gratings at the sides of the generator, and water vaporizing pans below said gratings and heated therefrom and communicating by lateral passages with the generator, substantially as described.

5. A generator furnace constructed with a generator, secondary air heating gratings at the sides of the generator, water vaporizing pans below said gratings and heated therefrom and communicating by lateral passages with the generator, said pans located in chambers independent of the hot product flues of the gratings; and hot product flues ranging below the vaporizing pans, substantially as described.

6. A generator furnace constructed with a generator having a closed top and lower hot product outlets leading to the upper secondary combustion chamber, secondary air heating gratings at the sides of the generator, a feed opening discharging fuel into the generator at a level above its hot product outlets, and water vaporizing pans below the gratings and communicating by lateral passages with the generator, substantially as described.

7. A generator furnace constructed with a generator having a closed top and lower hot product outlets leading to the upper secondary combustion chamber, secondary air heating gratings at the sides of the generator, a feed opening discharging fuel into the generator at a level above its hot product outlets, water vaporizing pans below said gratings and heated therefrom and communicating by lateral passages with the generator, said pans located in chambers independent of the hot product flues of the gratings, and hot product flues ranging below the vaporizing pans, substantially as described.

8. A generator furnace vaporizing pan provided with a valved casing admitting air and having a deflecting plate providing a circuitous air passage and excluding dust from the pan and steam space above it, substantially as described.

9. A generator furnace vaporizing pan provided with a water inlet casing having a supply pipe or orifice, an outlet, and an interposed partition or riffle plate retaining sediment and passing pure water to the pan, substantially as described.

10. A generator furnace constructed with a generator having a closed top and lower hot product outlets leading to the upper secondary combustion chamber, secondary air heating gratings at the sides of the generator, a feed opening discharging fuel into the generator at a level above its hot product outlets, water vaporizing pans below said gratings and communicating by lateral passages with the generator, a valved casing on said pans and having a deflecting plate providing a circuitous air passage and excluding dust from the pans and steam passages above them, said vaporizing pans also having a water inlet casing provided with a supply pipe or orifice, an outlet and an interposed partition or riffle plate retaining sediment and passing pure water to the pans, substantially as described.

In testimony whereof I affix my signature in presence of two witnesses.

AUGUST KLÖNNE.

Witnesses:
ALVIN K. GOODWIN,
KONRAD WOLFF.